United States Patent
Chalkias

(10) Patent No.: US 11,263,605 B2
(45) Date of Patent: Mar. 1, 2022

(54) WEIGHTED MULTIPLE AUTHORIZATIONS

(71) Applicant: R3 Ltd., London (GB)

(72) Inventor: Konstantinos Chalkias, London (GB)

(73) Assignee: R3 LLC, London (GB)

( * ) Notice: Subject to any disclaimer, the term of this patent is extended or adjusted under 35 U.S.C. 154(b) by 303 days.

(21) Appl. No.: 15/933,283

(22) Filed: Mar. 22, 2018

(65) Prior Publication Data

US 2019/0295050 A1    Sep. 26, 2019

(51) Int. Cl.
| | |
|---|---|
| *G06Q 20/40* | (2012.01) |
| *G06Q 30/02* | (2012.01) |
| *G06Q 20/32* | (2012.01) |
| *G06Q 20/34* | (2012.01) |
| *G06Q 20/38* | (2012.01) |
| *G06Q 20/06* | (2012.01) |
| *H04L 9/32* | (2006.01) |

(Continued)

(52) U.S. Cl.
CPC ......... *G06Q 20/0658* (2013.01); *G06Q 20/02* (2013.01); *G06Q 20/3825* (2013.01); *G06Q 20/3827* (2013.01); *G06Q 20/3829* (2013.01); *G06Q 20/40* (2013.01); *H04L 9/30* (2013.01); *H04L 9/3242* (2013.01); *G06Q 2220/00* (2013.01); *H04L 2209/56* (2013.01)

(58) Field of Classification Search
CPC .......... G06G 20/00–40; H04L 9/00–38; H04L 2209/00–88; G06Q 2220/00–18; G06Q 20/00–425

See application file for complete search history.

(56) References Cited

U.S. PATENT DOCUMENTS

| | | |
|---|---|---|
| 8,478,616 B2 | 7/2013 | De Klerk et al. |
| 10,529,041 B2 | 1/2020 | Brown |

(Continued)

FOREIGN PATENT DOCUMENTS

| | | |
|---|---|---|
| EP | 2031817 A1 | 3/2009 |
| EP | 3549080 A1 | 10/2019 |

(Continued)

OTHER PUBLICATIONS

Andrewas M. Antonopoulos, Mastering Bitcoin, 2014, First Edition, O'Reilly Media, Inc., Chapters 4 and 5 (Year: 2014).*

(Continued)

*Primary Examiner* — John W Hayes
*Assistant Examiner* — Chenyuh Kuo
(74) *Attorney, Agent, or Firm* — Perkins Coie LLP

(57) ABSTRACT

A system for confirming an authorization to consume an output of a transaction based on multiple signatures with different authority weights is provided. The system confirms the authorization to consume the output when the combined authority weights of one or more authorities that provide their authorizations satisfy a threshold weight. The authority weight for each authority and the threshold weight are identified in an authorization specification that specifies the criterion for the authorization of a matter. The authorization specification also specifies authorization verification information for each authority. When the sum of the authority weights of the authorities whose authorizations have been verified is greater than or equal to the threshold weight, the system confirms the authorization to consume the output.

22 Claims, 10 Drawing Sheets

(51) Int. Cl.
  *H04L 9/30* (2006.01)
  *G06Q 20/02* (2012.01)

(56) References Cited

U.S. PATENT DOCUMENTS

| | | |
|---|---|---|
| 10,529,042 B2 | 1/2020 | Brown |
| 10,803,537 B2 | 10/2020 | Brown |
| 2002/0019937 A1 | 2/2002 | Edstrom et al. |
| 2017/0109735 A1* | 4/2017 | Sheng .................. H04L 9/3297 |
| 2017/0300872 A1 | 10/2017 | Brown |
| 2017/0301033 A1 | 10/2017 | Brown |
| 2017/0301047 A1 | 10/2017 | Brown |
| 2017/0352012 A1 | 12/2017 | Hearn |
| 2017/0353309 A1 | 12/2017 | Gray |
| 2018/0075527 A1* | 3/2018 | Nagla .................. G06Q 40/025 |
| 2019/0179933 A1* | 6/2019 | Wang .................. G06F 16/2272 |
| 2020/0074422 A1 | 3/2020 | Hearn et al. |
| 2020/0082362 A1 | 3/2020 | Hearn et al. |
| 2020/0082363 A1 | 3/2020 | Hearn et al. |
| 2020/0082364 A1 | 3/2020 | Hearn et al. |
| 2020/0302409 A1 | 9/2020 | Hearn et al. |
| 2020/0349532 A1 | 11/2020 | Brown |

FOREIGN PATENT DOCUMENTS

| | | |
|---|---|---|
| WO | 2017182788 A1 | 10/2017 |
| WO | WO2018/100371 A1 | 6/2018 |
| WO | 2019180408 A1 | 9/2019 |

OTHER PUBLICATIONS

Andreas M. Antonopoulos, Mastering Bitcoin, Dec. 2014, O'Reilly Media, Inc., First Edition, pertinent pp. 132-135 (Year: 2014).*
Pratyush Dikshit et al., Efficient Weighted Threshold ECDSA for Securing Bitcoin Wallet, 2017, IEEE (Year: 2017).*
International Search Report and Written Opinion issued for PCT/GB2019/050739 and dated Jun. 4, 2019.
Nakamoto, Satoshi, "Bitcoin: A Peer-to-Peer Electronic Cash System", Oct. 31, 2008, pp. 1-9, http://nakamotoinstitute.org/static/docs/bitcoin.pdf.
Hearn, Mike, Corda: A distributed ledger:, Nov. 29, 2016, https://docs.corda.net/releases/release-M10.1/_static/ordia-technical-whitepaperpdf.
Stellar.Org and Contributors: "Multisignature | Stellar Developers", Apr. 15, 2017, https://web.archive.org/web/20170415150159/https://www.stellar.org/developers/guides/concepts/multi-sign.html.
Antonopoulos, A. "Mastering Bitcoin" 2014, First Edition, O'Reilly Media, Inc., Chapters 4 and 5 (Year: 2014).
Anonymous, "Transport Layer Security—Wikipedia," Jun. 23, 2017, XP055494532, Retrieved from the Internet: https://en.wikipedia.org/w/index.php?title=Transport_Layer_Security&oldid=787037092, p. 1, 9.
Bernstein, D. J. et al., "SPHINCS: pratical stateless has-based signatures," Advances in Cryptology—EUROCRYPT 2015—35th Annual International Conference on the Theory and Applications of Cryptographic Techniques, Sofia, Bulgaria, Apr. 26-30, 2015, pp. 368-397.
Bitfury: "Public versus Private Blockchains Part 2: Permissionless Blockchains White Paper," Oct. 20, 2015 (Oct. 20, 2015) XP055384695 retrieved from the Internet: URL:http://www.the-blockchain.com/docs/Jeff Garzik Public vs Private Blockchainpt2.pdf.
Castro, Miguel et al.: "Practical byzantine fault tolerance and proactive recovery" ACM Transactions on Computer Systems (TOCS), Nov. 1, 2002 (Nov. 1, 2002) pp. 398-461 XP055384854, New York, Retrieved from the Internet: URL:http://others.kelehrs.me/pdftByzantine.pdf abstract.
Dikshit, P. "Efficient Weighted Threshold ECDSA for Securing Bitcoin Wallet" 2017, IEEE (Year: 2017).
European Patent Office, EP Examination Report, EP Patent Application 17825913.1, dated Apr. 30, 2021, 9 pages.
Florian et al., "Bitcoin and Beyond: A Technical Survey on Decentralized Digital Currencies," International Associates for Cryptologic Research, vol. 20150517: 090557, May 15, 2015 (May 15, 2015), pp. 1-37, XP061018443).
Gareth William Peters et al. "Understanding Modern Banking Ledgers through Blockchain Technologies: Future of Transaction processing and Smart Contracts on the Internet of Money," Nov. 18, 2015, retrieved from internet.
Google: "Hyperledge Whitepaper" Feb. 17, 2016 (Feb. 17, 2016), XP055342588 retrieved from the Internet: URL:http://www.the-blockchain.com/docs/HyperledgerWhitepaper.pdf.
Grigg, Ian, "Digital Trading," Conference Paper, http://iang.org/papers/digital_trading.html, retrieved Sep. 26, 2016, 19 pages.
Grigg, Ian, "The Ricardian Contract," http://iang.org/papers/ricardian_contract.html/ retrieved Feb. 27, 2017, 7 pages.
Grigg, Ian, "The Ricardian Contract," Proceedings of the First IEEE International Workshop on Electronic Contracting, pp. 25-31, IEEE, 2004.
Hearn, Mike et al., Corda: a distributed ledger, Aug. 20, 2019, URL:https://www.corda.net/wp-content/uploads/2019/08/corda-technical-whitepaper-August-29-2019.pdf.
Hearn, Mike, Corda: A distributed ledger:, Nov. 29, 2016, https://docs.corda.net/releases/release-M10.1/_static/ordia-technical-whitepaper.pdf.
International Search Report and Written Opinion issued for PCT/GB2017/051069 and dated Jul. 6, 2017.
International Search Report and Written Opinion issued for PCT/GB2017/053604 and dated Mar. 16, 2018.
International Search Report and Written Opinion issued for PCT/GB2019/050739 dated Jun. 4, 2019.
International Search Report and Written Opinion dated Apr. 20, 2021, App. PCT/US2021/015469.
Nakamoto, Satoshi, "Bitcoin: A Peer-to-Peer Electronic Cash System," http://www.bitcoin.org/bitcoin.pdf, pp. 1-9, Jul. 4, 2010.
Peters et al., "Understanding Modern Baking Ledgers through Blockchain Technologies: Future of Transaction Processing and Smart Contracts on the Internet of Money," Nov. 18, 2015 URL:http://www.the-blockchain.com/docs/Understanding Modern Banking Ledgers through Blockchain Technologies.pdf private distributed ledger.
Ricardian Contract, https://en.wikipedia.org/wiki/Ricardian_Contract, 5 pages.
Stellar.Org and Contributors: "Multisignature | Stellar Developers", Apr. 15, 2017, https://web.archive.org/web/20170415150159/https://www.stellar.org/developers/guides/concepts/ulti-sig.html.
Swan, Melanie. "Blockchain: Blueprint For a New Economy," O'Reilly Media Inc., Sebastopol, CA, Feb. 2015, 149 pages.
Wikipedia, "Digital Signatures," retrieved from <https_://en_.wikipedia_.org/w/index.php?title=Digital_signature&oldid=744808460> on Apr. 23, 2021, 11 pages.
Wood, Gavin, "Ethereum: A Secure Decentralised Generalised Transaction Ledger," EIP-150 Revision, http://gavwood.com/paper.pdf, retrieved Mar. 1, 2017 pp. 1-32.
Amendment in Response to Non-Final Office Action, filed on Jul. 6, 2021, in U.S. Appl. No. 16/890,285, 14 pages.
International Search Report and Written Opinion, PCT Patent Application PCT/GB2019/051589, dated Nov. 27, 2019, 20 pages.
Non-Final Office Action dated Apr. 14, 2021, received in U.S. Appl. No. 16/890,285, 15 pages.
U.S. Appl. No. 62/427,685, filed Nov. 29, 2016, titled Corda: A Distributed Ledger, 53 pages.
White Paper, https://github.com/ethereum/wiki/wiki/White-Paper, retrieved Feb. 27, 2017, 25 pages.
Notice of Allowance dated Aug. 25, 2021, received in U.S. Appl. No. 16/890,285, 15 pages.

* cited by examiner

WEIGHTED MULTIPLE AUTHORIZATIONS

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) involving the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

Distributed ledger systems require the signature of a designated authorizing party ("authority") to consume the output of a transaction such as a transaction to transfer ownership of an asset. For example, the signature of the owner (i.e., the authority) of a bitcoin is required to be in a transaction to transfer ownership of that bitcoin to a new owner. The signature is generated by the owner encrypting the hash of the prior transaction that transferred the bitcoin to the owner with the private key corresponding to the public key included in the prior transaction.

In many domains, requiring the authorization of only a single authority may not be sufficient to provide the needed level of security. For example, a governmental entity that is responsible for providing to its citizens notifications of imminent threats (e.g., an attack or a natural disaster) may want to require the authorization of multiple authorities before sending such a notification. As another example, a bank that has been transferred a large number of bitcoins may want to require the authorization of multiple authorities (e.g., the vice-president of finance and the vice-president of compliance) before the bitcoins can be transferred. As another example, a company that is a party to a contract may specify that the contract is not valid unless signed by multiple people (e.g., the president and the controller of the company along with a member of the board of directors of the company).

To support the need for multiple authorizations to take an action, many distributed ledger systems support multi-signature authorizations. For example, the script language for the bitcoin system supports a "multi-sig" instruction. The multi-sig instruction has some number of public keys as one input parameter and a threshold number of public keys as another parameter. When the multi-sig instruction of a prior transaction is executed when validating a current transaction that inputs an output of the prior transaction, the multi-sig instruction indicates that the current transaction has been authorized when at least the threshold number of distinct signatures of the prior transaction has been verified using the public keys of the multi-sig instruction. For example, when the multi-sig instruction includes ten public keys and the threshold number is five, then the current transaction is authorized when five of the public keys have been used to verify five signatures of the current transaction. The multi-sig instruction can be considered to represent a threshold number of authorizations out of equally valued (or weighted) authorizations. Although such multi-signature authorizations provide a much higher level of security than single-signature authorizations, such multi-signature authorizations require a pre-specified threshold number of signatures and the signatures of any of the authorizing parties can be used to meet that threshold number. Moreover, such multi-signature authorizations do not support options such as requiring either the signatures of two specified persons or only the signature of a different specified person (e.g., the president and the controller of a company or just the signature of a board member).

DETAILED DESCRIPTION

Figure 1:
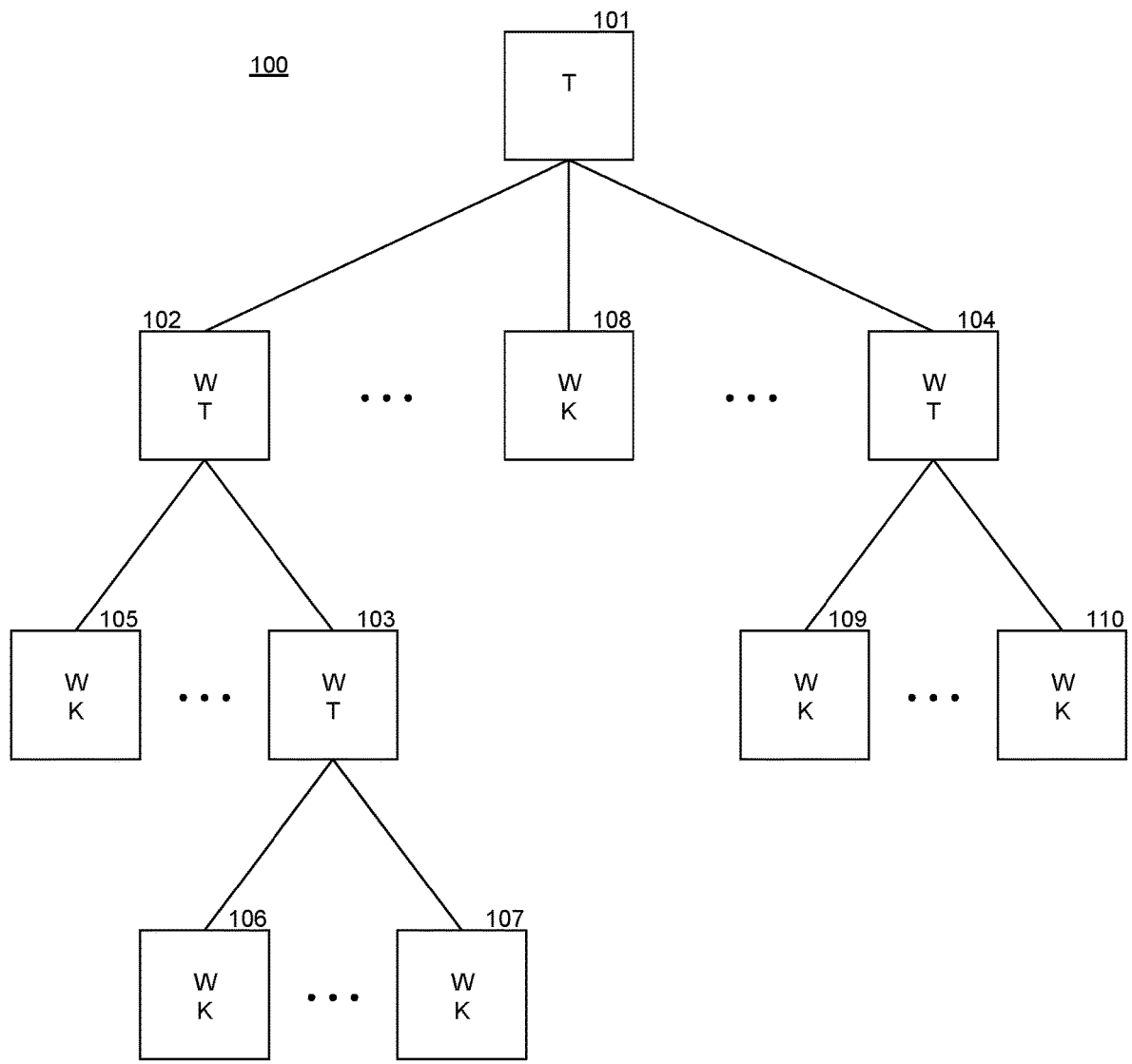
FIG. 1 illustrates an overall structure of tree representations of authorization specifications.

A method and system for confirming an authorization of a matter based on multiple signatures with different authority weights is provided. In some embodiments, a weighted multiple authorization ("WMA") system confirms authorization of a matter when the combined authority weights of one or more authorities that provide their authorizations satisfy a threshold weight. For example, with the bitcoin system, an authority provides an authorization to transfer an amount of bitcoin that is output by a prior transaction (i.e., the matter being authorized) by signing with their private key a hash of the prior transaction whose output is input to a current transaction. The authority weights of the authorities vary so that the authorizations of some authorities are weighted more than other authorities. For example, a first authority may have a weight of 1 and a second authority may have a weight of 3, which means that the authorization of the second authority counts three times as much toward satisfying the threshold weight. The authority weight for each authority and the threshold weight are identified in an authorization specification that specifies the criteria for the authorization of a matter. The authorization specification also specifies authorization verification information for each authority. For example, an authorization specification may include authority weights of 1, 2, and 3 for authorities A, B, and C, respectively, and a threshold weight of 3. The authorization specification may also include the public keys of authorities A, B, and C as their authorization verification information. When the sum of the authority weights of the authorities whose authorizations have been verified is greater than or equal to the threshold weight, the WMA system confirms the authorization. For example, if the authorizations of authorities A and B are verified, then the WMA confirms authorization because the sum of their authority weights equals the threshold weight irrespective of whether the authorization of authority C has been provided or verified. Alternatively, if the authorization of authority C is verified, then the WMA system confirms authorization because the authority weight of authority C equals the threshold weight irrespective of whether the authorizations of authorities A or B have been provided or verified. The authorization specification of this example effectively implements the Boolean expression of "(A and B) or C," meaning that authorization of the matter is confirmed when the authorization of both A and B are verified or when the authorization of C is verified. This authorization specification would require, for example, the authorizations of two vice-presidents of a company to confirm authorization of a matter or the authorization of the president alone to confirm authorization of the matter.

Although the WMA system is described primarily in the context of matters relating to the recording of transactions in a distributed ledger, the term "matter" refers to anything that can be authorized. For example, a matter may be a person entering a secure location. Authorization to enter may be confirmed when the authorization of two security guards is verified or when the authorization of the head of security is verified. As other examples, a matter may be executing a contract on behalf of a company, accessing a safety deposit box, leaving a country, selling or purchasing assets such as personal or real property, and so on.

Although the WMA system is described primarily in the context of authorizations that are based on private/public key encryption, the WMA system may be used with other techniques for providing authorizations. For example, the WMA system may be used with authorities who have security tokens. A security token may store a static password. A security token may alternatively generate a dynamic password based on synchronized clocks of the security token and the WMA system. A security token may also be a smartphone or other device that receives from the WMA system a one-time code when an authority is to provide its authorization. Once the WMA system receives the password or one-time code for an authority, it verifies the authorization of that authority based on the password or one-time code. As another example, the WMA system may be used with authorities who have physical keys. Thus, when the WMA system is described as using signature-based authorizations, the authorizations may be based alternatively on these other techniques.

In some embodiments, an authority may be a parent authority with multiple child authorities whose authorizations determine whether authorization of the parent authority is verified. Continuing with the example of authorities A, B, and C, authority B may be a parent authority with child authorities $B_1$, $B_2$, and $B_3$, which are considered to be sibling authorities represented by sibling nodes. The parent authority has a threshold weight, and each child authority has an authority weight. For example, the parent authority B may have a threshold weight of 2 and the child authorities $B_1$, $B_2$, and $B_3$ may have authority weights of 1, 1, and 2, respectively. The authorization of parent authority B is verified when the sum of the authority weights of the child authorities whose authorizations are verified is equal to or greater than the threshold weight of authority B. Thus, such an authorization specification may be represented by the Boolean expression of "((A and (($B_1$ and $B_2$) or $B_3$)) or C)." A parent authority thus has a threshold weight that needs to be satisfied by the sum of the authority weights of its child authorities whose authorizations have been verified. When the threshold weight of the parent authority is satisfied, the authorization of the parent authority is verified. A parent authority (except for the topmost parent authority) also has an authority weight that is used in the verification of the authorization of its parent authority when its authorization has been verified.

In some embodiments, the WMA system may support the use of weighted multiple signatures for a blockchain system such as bitcoin. To support weighted multiple signatures, a blockchain system may define a "weighted multi-sig" instruction. The weighted multi-sig instruction may have two parameters: an authorization specification and a set of signatures (i.e., authorizations), possibly along with the identification (e.g., public key) of the authority who provided each signature. When the instruction is executed, it verifies the signatures (i.e., verified authorizations) using the public keys of the authorization specification. The instruction then uses the verified signatures to determine whether the threshold weights of the authorization specification are satisfied and ultimately to determine the threshold weight of the topmost parent authority. If the authorization of the topmost parent authority is satisfied, then the instruction indicates that the authorization as specified by the authorization specification has been verified. For distributed ledgers that support smart contracts (e.g., Hyperledger or Ethereum), the WMA system may be implemented, at least in part, in the code of the smart contracts associated with transactions.

In some embodiments, a single authority may use the WMA system to provide enhanced security in providing its authorization for a matter. If the authority relies on a private/public key pair to provide authorization and if the private key is compromised (e.g., stolen or the encryption scheme broken), then another party could use the private key to provide malicious authorization for the matter. To help prevent such malicious authorization, the authority could use the WMA system to require multiple authorizations from itself. For example, an authority can specify that authorizations based on three different private keys (or security tokens) are needed to confirm the authorization for the matter. The authority may store the private keys in different ways such as storing the first private key on a cloud system, the second private key on a USB token, and the third private key in a key vault on a desktop computer. In this way, if one private key is compromised, then another party cannot provide malicious authorization for the matter because the other party does not access to the two other private keys. Also, the single party may employ various authorization specifications such as of "(($A_1$ and $A_2$) or $A_3$)." With such an authorization specification, the single party may store the private key for $A_3$ in an ultra-secure vault that is accessed only if the private key for $A_1$ or $A_2$ is lost. Also, the authority may use different algorithms to generate the private/public key pairs. For example, the first key pair may be generated using an Rivest-Shamir-Adelman ("RSA") algorithm such as RSA-3072, the second key pair may be generated using an Elliptical Curve Digital Signature Algorithm ("ECDSA"), and the third key pair may be generated using a SPHINCS algorithm (see, Daniel J. Bernstein, Daira Hopwood, Andreas Hülsing, Tanja Lange, Ruben Niederhagen, Louiza Papachristodoulou, Michael Schneider, Peter Schwabe, Zooko Wilcox-O'Hearn. "*SPHINCS: practical stateless hash-based signatures*," Advances in Cryptology—EUROCRYPT 2015-34th Annual International Conference on the Theory and Applications of Cryptographic Techniques, Sofia, Bulgaria, Apr. 26-30, 2015, pp. 368-397, which is herein incorporated by reference). Continuing an the example authorization specification of "($A_1$ and $A_2$)," if the algorithm used to generate $A_1$ is broken, then the another party cannot provide malicious authorization to the matter.

The WMA system may be used to employ different algorithms for various reasons. For example, the RSA algorithms and the ECDSA algorithms are considered to be classical algorithms because they are considered to be not secure in light of quantum computing. In contrast, the SPHINCS algorithm is considered to be a post-quantum algorithm because it is considered to be secure in light of quantum computing. The WMA system may thus support authorizations based on a combination of classical algorithms and post-quantum algorithms. An authorization specification may be "(A and B)" where A represents authorization with a classical algorithm and B represents authorization with a post-quantum algorithm. Thus, the authorization is secure even if one of the classical algorithms or the post-quantum algorithms (but not both) is compromised. As another example, different regulators (e.g., a national banking regulator) may require access to information that is accessible using certain algorithms. A first banking regulator of one country may require use of an RSA algorithm, and a second banking regulator of another country may require use of an ECSA algorithm. In such a case, the WMA system may be used to verify authorization based on using either algorithm, which may be represented as "(A or B)" where A represents the authorization of the first banking regulator and B represents the authorization of the second banking authority. As another example, a first regulator for security reasons may require that authorization be allowed only based on a first algorithm under the assumption that the first algorithm is very secure. A second regulator for similar reasons may require that authorizations be allowed only based on a second algorithm. In such a case, to accommodate both regulators, they may agree to an authorization that requires both algorithms with an authorization specification such as "(A and B)" where A represents the first algorithm and B represents the second algorithm.

FIG. 1 illustrates an overall structure of tree representations of authorization specifications. A tree 100 includes nodes 101-110, each of which represents an authority. The ellipses indicate that the tree can have many other nodes. Node 101 is a root node, nodes 102-104 are non-leaf nodes, and nodes 105-110 are leaf nodes. The non-leaf nodes (including the root node) represent parent authorities, and nodes 105-110 represent authorities whose authorization verification information is included in an authorization specification. A parent authority is considered to be a composite authority because it represents a composite of the authorities of its descendant leaf nodes. The non-leaf nodes include a threshold weight ("T") and, except for the root node, an authority weight ("W"). The leaf nodes include an authority weight and authorization verification information ("K"). The WMA system supports authorization specifications with a tree of arbitrary width and depth.

Figure 2A:
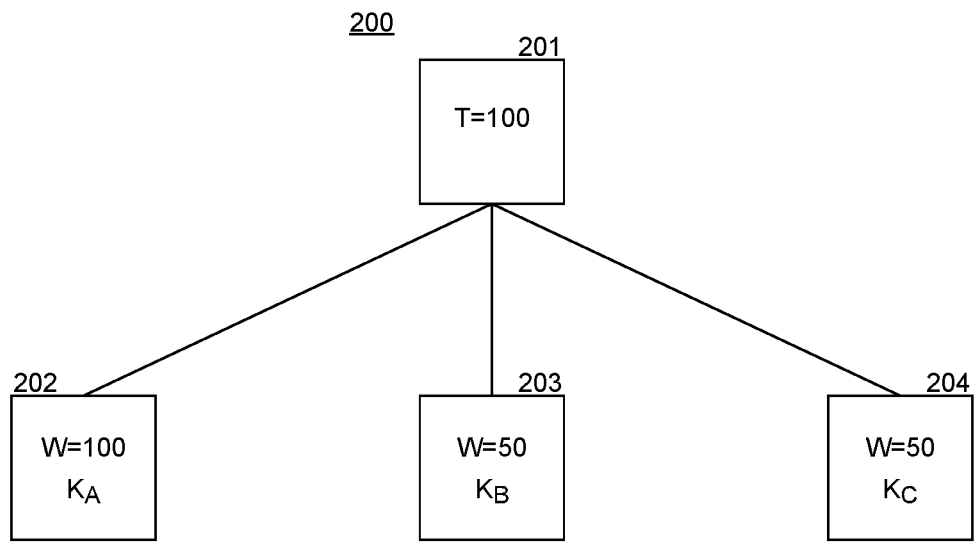
FIGS. 2A and 2B illustrate example tree representations of authorization specifications.
Figure 2B:
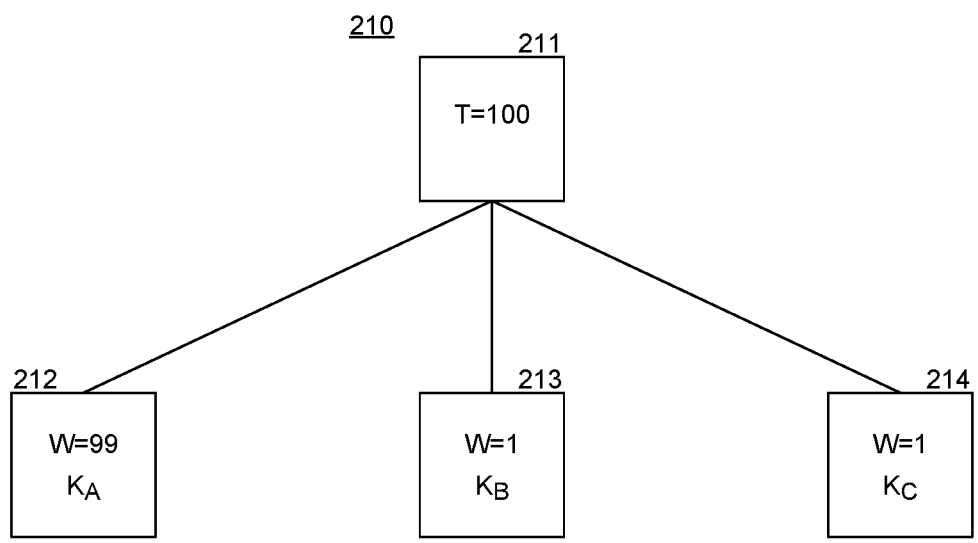

FIGS. 2A and 2B illustrate example tree representations of authorization specifications. A tree 200 includes a root node 201, which is a parent authority, with a threshold weight of 100, leaf node 202 represents authority A and has an authority weight of 100 and a public key $K_A$ of authority A, leaf node 203 represents authority B and has an authority weight of 50 and a public key $K_B$ of authority B, and leaf node 204 represents authority C and has an authority weight of 50 and a public key $K_C$ of authority C. The tree 200 represents an authorization specification represented by the Boolean expression "(A or (B and C))" because the authority weight of authority A is equal to the threshold weight and the sum of the authority weights of authority B and authority C is equal to the threshold weight. A tree 210 includes a root node 211, which is a parent node, with a threshold weight of 100, leaf node 212 represents authority A and has an authority weight of 99 and a public key $K_A$, leaf node 213 represents authority B and has an authority weight of 1 and a public key $K_B$, and leaf node 214 represents authority C and has an authority weight of 1 and a public key $K_C$. The tree 210 represents an authorization specification represented by the Boolean expression "(A and (B or C))" because the sum of the authority weights of authority A and authority B is equal to the threshold weight and the sum of the authority weights of authority A and authority C is equal to the threshold weight. In general, the authority weights of at least two sibling nodes are different.

Figure 3:
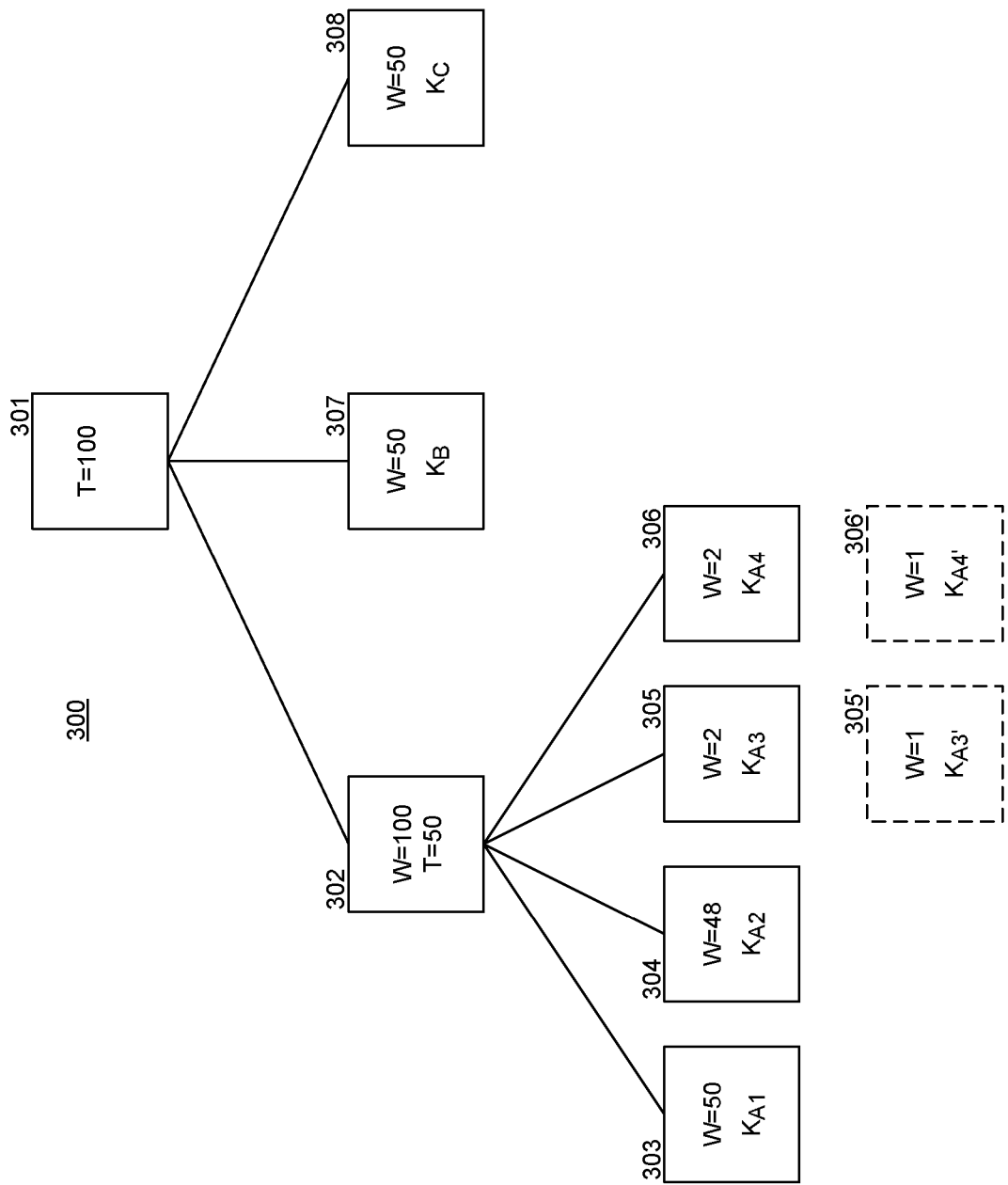
FIG. 3 illustrates an example tree representation of an authorization specification.

FIG. 3 illustrates an example tree representation of an authorization specification. A tree 300 includes a root node 301, non-leaf node 302, and leaf nodes 303-308. The tree 300 is similar to the tree 200 except that node 202 representing authority A is replaced by a parent node 302 for a parent authority A. A parent node may also be referred to as a "composite key" in the sense that it has multiple descendant nodes with public keys. For example, node 302 represents a composite key because it is the parent node, or more generally the ancestor node, of multiple leaf nodes that include keys. The nodes 303-306 include authority weights and public keys $K_{A1}$-$K_{A4}$ for child authorities A1-A4 of authority A. The tree 300 represents an authorization specification represented by the Boolean expression of "((A1 or (A2 and (A3 or A4))) or (B and C))." If nodes 305' and 306' were to replace nodes 305 and 306, then the authorization specification would be represented by the Boolean expression of "((A1 or (A2 and A3 and A4)) and (B and C))."

Figure 4:
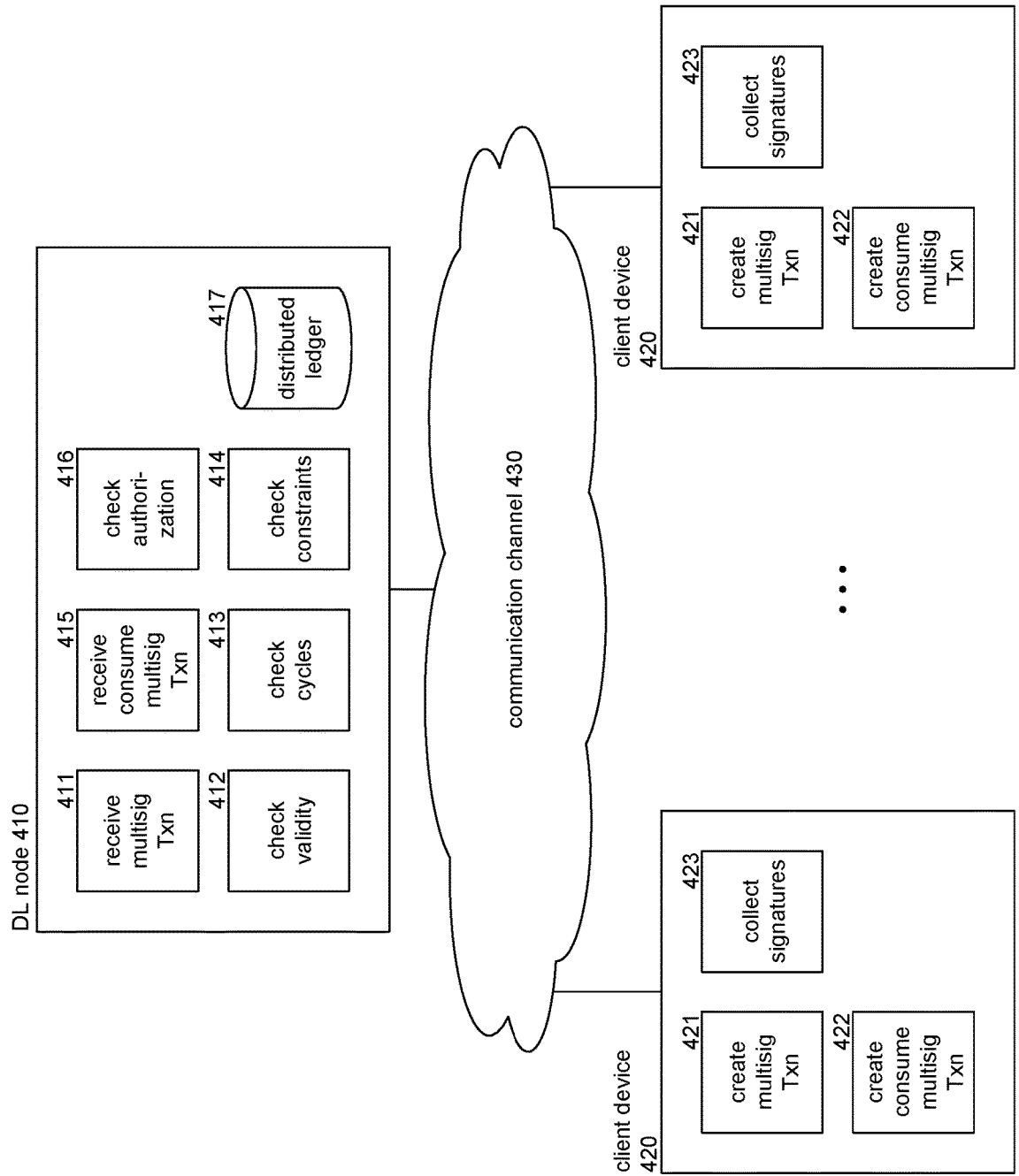
FIG. 4 is a block diagram that illustrates components of the WMA system in some embodiments.

FIG. 4 is a block diagram that illustrates components of the WMA system in some embodiments. In the following, the WMA system is described primarily in the context of authorizations to consume outputs of transactions recorded in a distributed ledger such as a blockchain. The WMA system can also be used for authorization of other matters, as described above. The WMA system provides components for distributed ledger nodes 410 and client devices 420 that are connected via a communication channel 430. The distributed ledger nodes include a receive multi-signature transaction component 411, a check validity component 412, a check cycles component 413, a check constraints component 414, a receive consume multi-signature transaction component 415, and a check authorization component 416. The distributed ledger nodes also include a distributed ledger store 417 for storing, for example, blocks of a blockchain. The receive multi-signature transaction component receives a transaction that includes an authorization specification and invokes the check validity component to ensure that the authorization specification is valid. The check validity component invokes the check cycles component to ensure that the authorization specification represents a properly formed tree (e.g., without cycles) and invokes the check constraints component to ensure that the authorization specification satisfies various constraints. The receive consume multi-signature transaction component receives a current transaction to consume an output of a prior transaction that includes an authorization specification and invokes the check authorization component to verify the authorization of the current transaction based on the authorization specification. The client devices include a create multi-signature transaction component 421, a create consume multi-signature transaction component 422, and a collect signatures component 423. The create multi-signature transaction component creates a transaction that includes an authorization specification. The create consume multi-signature transaction component creates a transaction that consumes the output of a multi-signature transaction. The create consume multi-signature transaction component invokes the collect signatures component to collect signatures of authorities specified by the authorization specification of a multi-signature transaction to consume the output of the multi-signature transaction. The collect signature component may interact with user interface components to obtain confirmations from the authorities to use their private keys to sign the prior multi-signature transaction whose output is to be consumed. The client devices may store private keys locally, access private keys stored remotely, or receive private keys from the authority each time a signature is needed. The collect signature component may alternatively obtain such confirmations from other computing devices or may receive signatures from other computing devices without having any access to private keys.

The computing systems (e.g., network nodes or collections of network nodes) on which the WMA system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the WMA system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The WMA system may be described in the general context of computer-executable instructions, such as program modules and components, executed by one or more computers, processors, or other devices. Generally, program modules or components include routines, programs, objects, data structures, and so on that perform tasks or implement data types of the WMA system. Typically, the functionality of the program modules may be combined or distributed as desired in various examples. Aspects of the WMA system may be implemented in hardware using, for example, an application-specific integrated circuit ("ASIC") or field programmable gate array ("FPGA").

Figure 5:
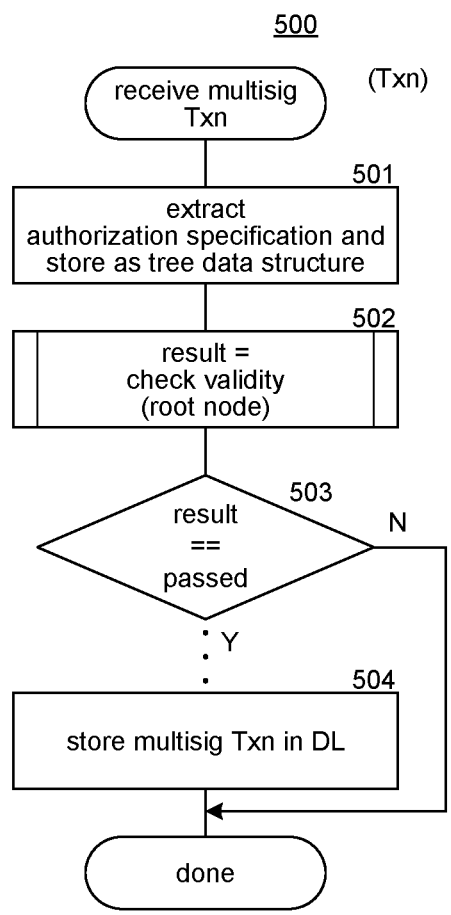
FIG. 5 is a flow diagram that illustrates the processing of a receive multi-signature transaction component in some embodiments.

FIG. 5 is a flow diagram that illustrates the processing of a receive multi-signature transaction component in some embodiments. A receive multi-signature transaction component 500 is passed a transaction that includes an authorization specification, checks the validity of the transaction, and, if the transaction is valid, stores the transaction in the distributed ledger. In block 501, the component extracts the authorization specification and stores it as a tree data structure. In block 502, the component invokes a check validity component, passing an indication of the root node of the tree, and receives the result of the validity check. In decision block 503, if the result indicates that the validity check was passed, then the component continues at block 504, else the component completes. In block 504, the component stores the multi-signature transaction in the distributed ledger. The component then completes. The ellipsis between blocks 503 and 504 indicates that the component would typically perform additional validity checks (e.g., check for spent inputs) to ensure that the transaction is valid for reasons unrelated to the authorizations.

Figure 6:
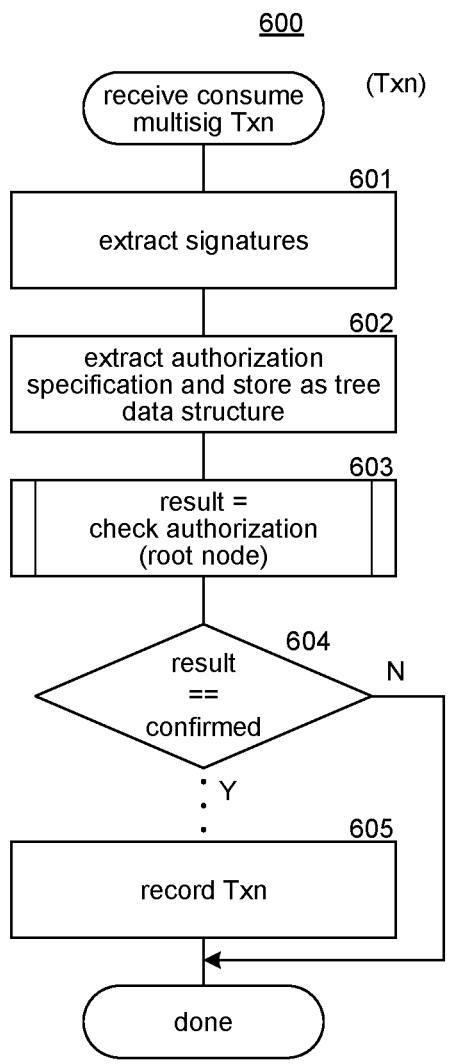
FIG. 6 is a flow diagram that illustrates the processing of a receive consume multi-signature transaction component in some embodiments.

FIG. 6 is a flow diagram that illustrates the processing of a receive consume multi-signature transaction component in some embodiments. The receive consume multi-signature transaction component 600 is passed an indication of a current transaction that consumes the output of a prior transaction with an authorization specification, confirms the authorization to consume the output, and if the authorization is confirmed, records the current transaction. In block 601, the component extracts signatures from the current transaction. In block 602, the component extracts the authorization specification from the prior transaction and stores it as a tree data structure. In block 603, the component invokes a check authorization component, passing an indication of the root node of the tree data structure, and receives the result of the check. In decision block 604, if the result indicates that authorization has been confirmed, then the component continues at block 605, else the component completes. In block 605, the component records the current transaction in the distributed ledger and completes. The ellipsis between blocks 604 and 605 indicates that the component would typically perform validity checks (e.g., check for spent inputs) to ensure that the transaction is valid for reasons unrelated to the authorizations.

Figure 7:
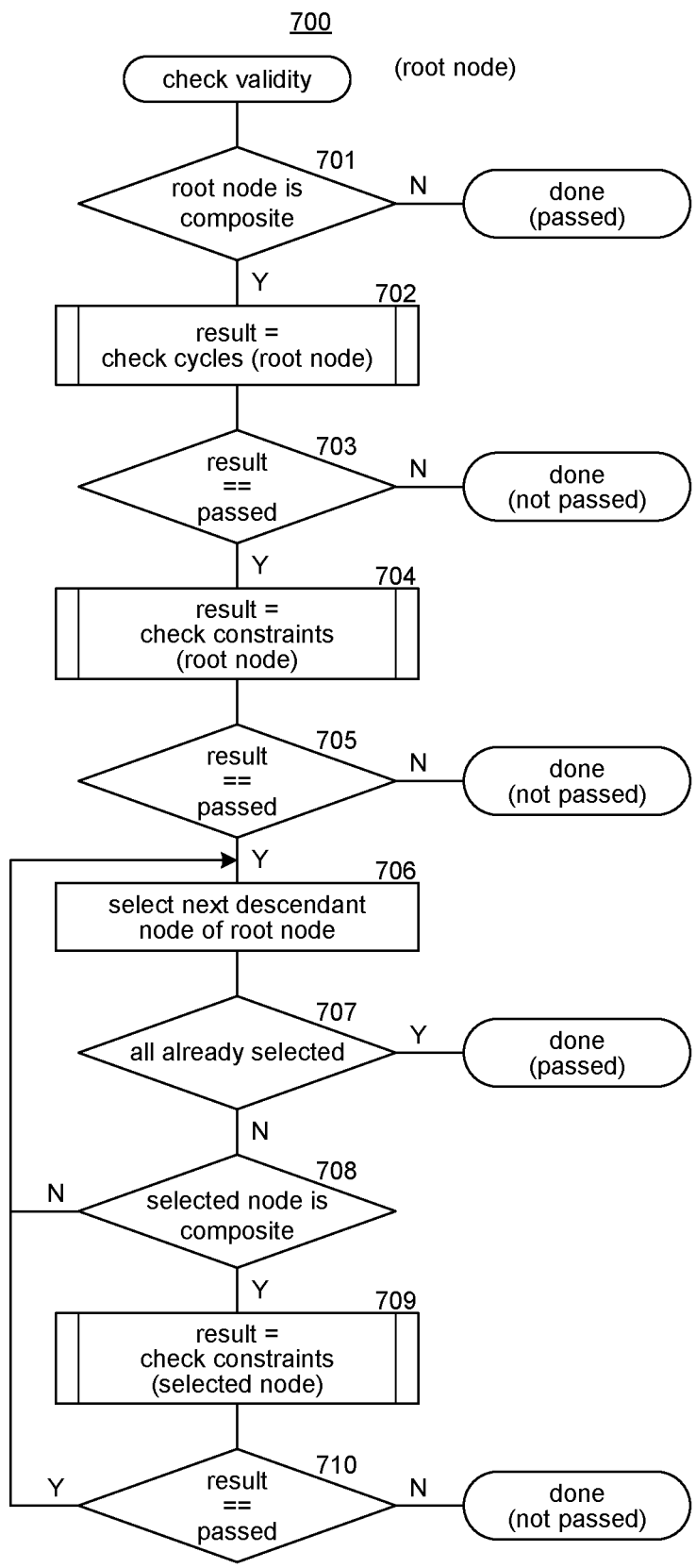
FIG. 7 is a flow diagram that illustrates the processing of a check validity component in some embodiments.

FIG. 7 is a flow diagram that illustrates the processing of a check validity component in some embodiments. A check validity component 700 is passed a root node of a tree representing an authorization specification and ensures that the authorization specification is valid. In decision block 701, if the root node is a composite node (i.e., represents a parent authority), then the component continues at block 702, else the component completes, indicating that the validity check was passed. In block 702, the component invokes the check cycles component, passing an indication of the root node and receiving the result of the check. In decision block 703, if the result indicates that the cycle check was passed (e.g., no cycles), then the component continues at block 704, else the component completes, indicating that the validity check was not passed. In block 704, the component invokes a check constraints component, passing an indication of the root node and receiving the result of the check of the constraints. In decision block 705, if the result indicates that the check of constraints was passed, then the component continues at block 706, else the component completes, indicating that the validity check was not passed. In blocks 706-710, the component checks the constraints of each descendent node. In block 706, the component selects the next descendent node of the root node. In decision block 707, if all the descendent nodes have already been selected, then the component completes, indicating that the validity check was passed, else the component continues at block 708. In decision block 708, if the selected node represents a composite authority, then the component continues at block 709, else the component loops to block 706 to select the next descendent node. In block 709, the component invokes the check constraints component, passing an indication of the selected node, and receives the result of the check of the constraints. In decision block 710, if the result indicates that the check of the constraints was passed, then the component loops to block 706 to select the next descendent node, else the component completes, indicating that the validity check was not passed.

Figure 8:
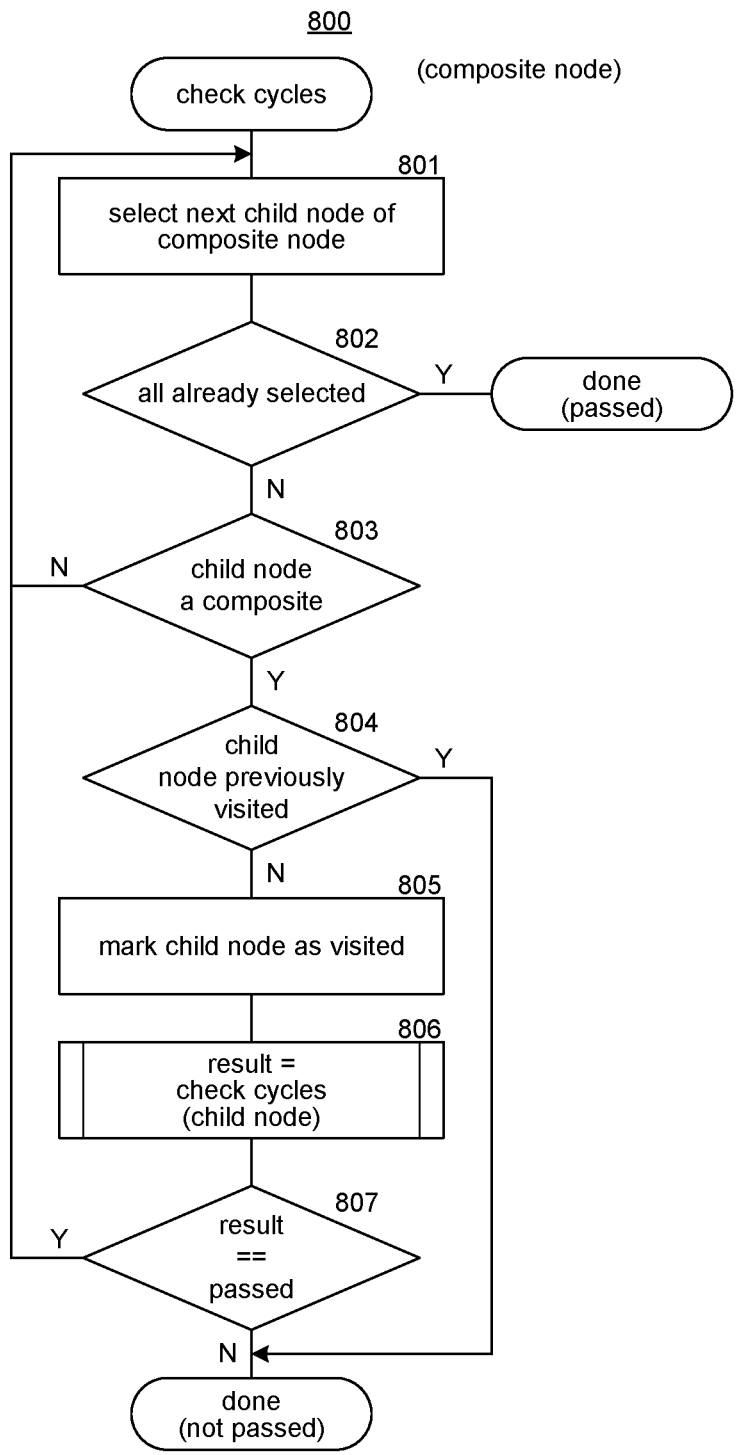
FIG. 8 is a flow diagram that illustrates the processing of a check cycles component in some embodiments.

FIG. 8 is a flow diagram that illustrates the processing of a check cycles component in some embodiments. A check cycles component 800 is invoked, passing an indication of a composite node, and checks for cycles. The component is initially passed a root node and is recursively invoked to process descendent nodes. In block 801, the component selects the next child node of the composite node. In decision block 802, if all the child nodes have already been selected, then the component completes, indicating that the check for cycles was passed, else the component continues at block 803. In decision block 803, if the child node is a composite node, then the component continues at block 804, else the component loops to block 801 to select the next child node. In decision block 804, if the child node has been previously visited (i.e., a cycle exists), then the component completes, indicating that the check for cycles was not passed, else the component continues at block 805. In block 805, the component marks the child node as having been visited. In block 806, the component invokes the check cycles component, passing an indication of the child node and receiving an indication of whether the check for cycles was passed. In decision block 807, if the result indicates that the check for cycles was passed, then the component loops to block 801 to select the next child node, else the component completes, indicating that the check for cycles was not passed.

Figure 9:
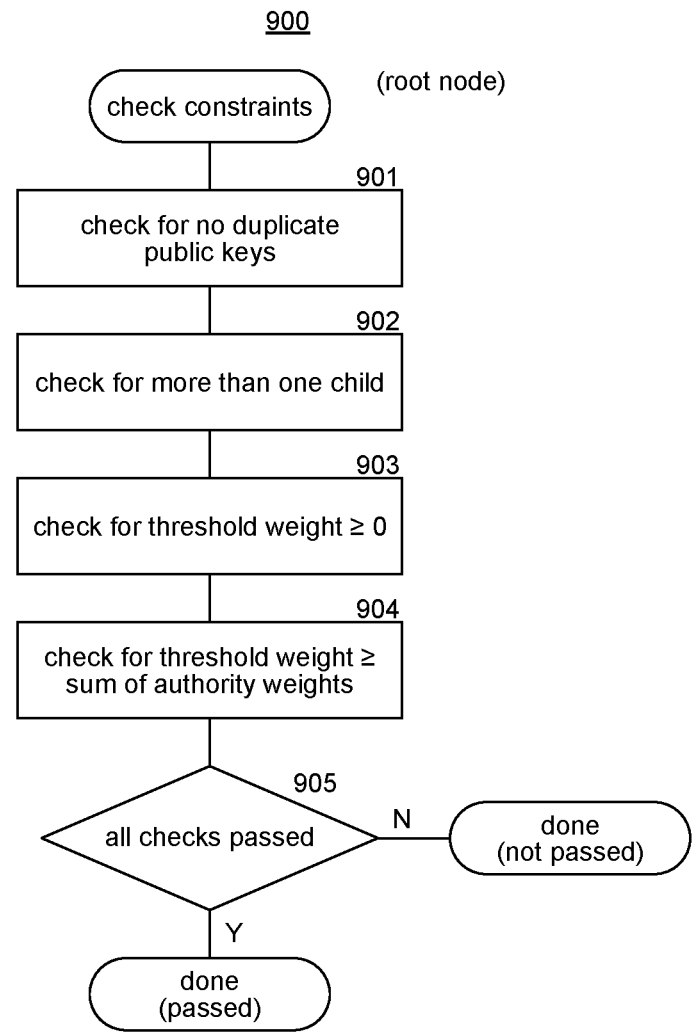
FIG. 9 is a flow diagram that illustrates the processing of a check constraints component in some embodiments.

FIG. 9 is a flow diagram that illustrates the processing of a check constraints component in some embodiments. A check constraints component 900 is passed an indication of the root node of a tree that represents an authorization specification and determines whether the tree satisfies various constraints. In block 901, the component checks to ensure that there are no duplicate public keys in the authorization specification. The presence of a duplicate public key would indicate that an authority would need to provide multiple signatures. In such a case, the authorization specification could be reformulated to avoid the need for such multiple signatures. Alternatively, the WMA system could be implemented to accommodate such multiple signatures. In block 902, the component checks to ensure that each non-leaf node includes more than one child node. If a non-leaf node included only one child node, then the non-leaf node could be replaced by the child node. In block 903, the component checks to ensure that each threshold weight is greater than or equal to zero. In block 904, the component checks to ensure that the threshold weight of a non-leaf node is greater than or equal to the sum of the authority weights of its child nodes. If such threshold weight was not equal to or greater than such sum, the authorization of the parent authority of the non-leaf node could never be confirmed. In decision block 905, if all the checks have been passed, then the component completes with an indication that the checks have been passed, else the component completes with an indication that the checks were not passed.

In some embodiments, the component may perform additional checks. For example, the component may ensure that the sum of all possible combinations of authority weights of child nodes of a parent node is not greater than the maximum integer value to prevent an overflow when checking authorizations. The WMA system may also represent weights as real values. Also, rather than using explicit authority weights and threshold weights, the WMA system may represent an authorization specification using a Boolean expression, as described above. If so, the authority weights and the threshold weights could all be considered to be 1 (e.g., true). In such a case, a value of 1 or true can be used to represent authorities whose authorization is verified and 0 or false can be used otherwise. So, for example, the authorization specification represented by tree 300 may be verified by evaluating the Boolean expression of "((A1 or (A2 and (A3 or A4))) or (B and C))." If the authorization of A2, B, and C are verified, the expression to evaluate would be "((0 or (1 and (0 or 0))) or (1 and 1))," which would evaluate to 1 or true, confirming authorization.

Figure 10:
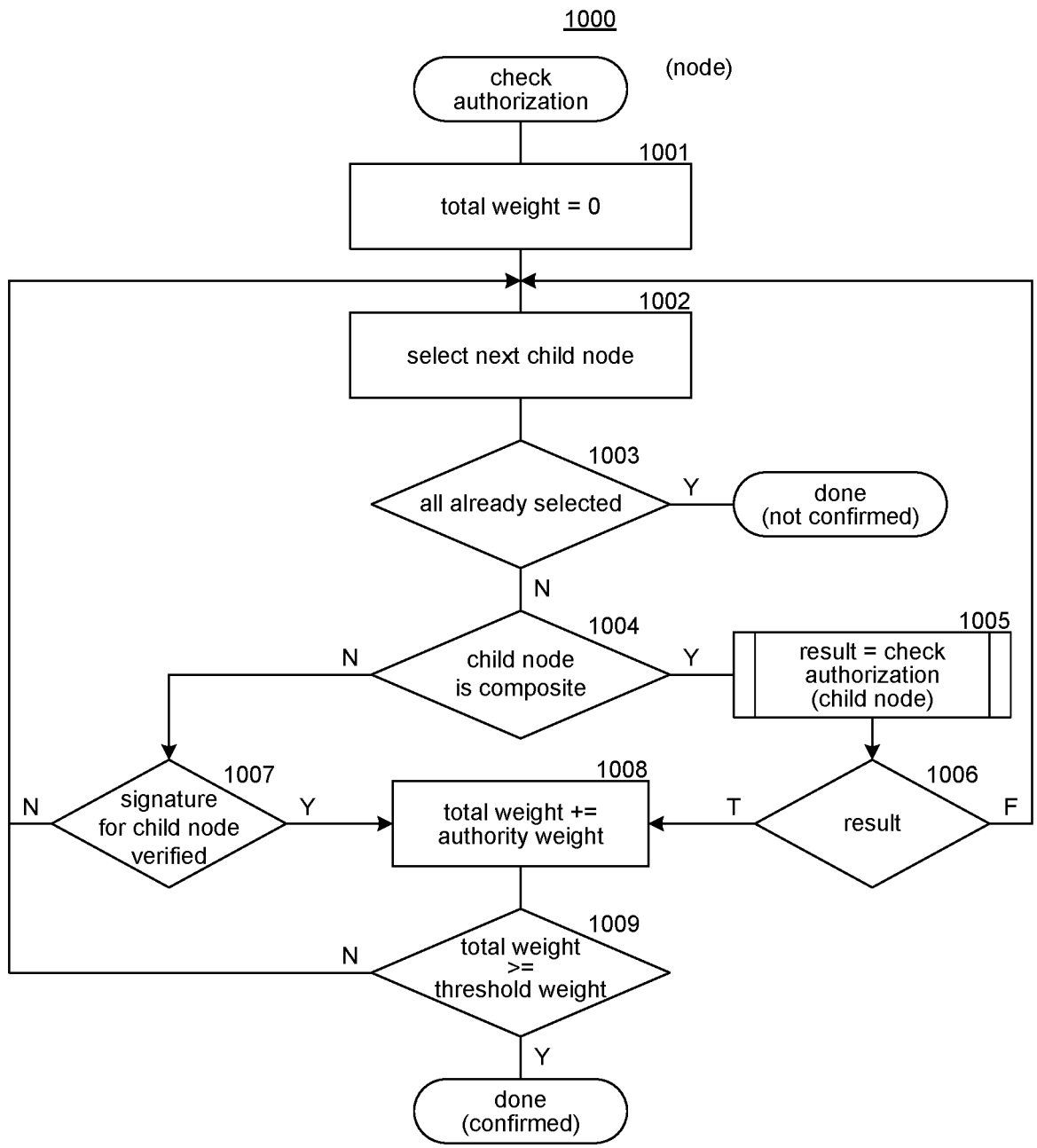
FIG. 10 is a flow diagram that illustrates the processing of a check authorization component in some embodiments.

FIG. 10 is a flow diagram that illustrates the processing of a check authorization component in some embodiments. A check authorization component 1000 is passed an indication of a node and determines whether the signatures indicate that the authorization is provided. In block 1001, the component initializes a total weight variable to zero. The total weight variable will accumulate the authority weights of authorizations of child nodes. In block 1002, the component selects the next child node. In decision block 1003, if all the child nodes have already been selected, then the component completes, returning an indication that the authorization check was failed, else the component continues at block 1004. In decision block 1004, if the child node represents a composite authority, then the component continues at block 1005, else the component continues at block 1007. In block 1005, the component recursively invokes the check authorization component, passing an indication of the selected node and receiving the result of the check. In decision block 1006, if the result indicates that the authorization was passed, then the component continues at block 1008, else the component loops to block 1002 to select the next child node. In decision block 1007, if the signature for the child node has been provided and verified, then the component continues at block 1008, else the component loops to block 1002 to select the next child node. In block 1008, the component increments the total weight by the authority weight of the child node. In decision block 1009, if the total weight is greater or equal to than the threshold weight of the passed node, then the component completes, indicating that the authorization has been confirmed, else the component loops to block 1002 to select the next child node.

The following paragraphs describe various embodiments of aspects of the WMA system. An implementation of the WMA system may employ any combination of the embodiments. The processing described below may be performed by a computing device with a processor that executes computer-executable instructions stored on a computer-readable storage medium that implements the WMA system.

In some embodiment, a method performed by a computing system is provided for confirming an authorization based on multiple signatures of authorities. The method accesses an authorization specification that specifies a threshold weight and, for each of a plurality of authorities, signature verification information and an authority weight. The method accesses signatures of at least some of the authorities. For each signature of an authority, the method verifies the signature using the signature verification information of the authority. The method generates a sum of the authority weights of the verified signatures. When the sum of the authority weights satisfies the threshold weight, the method indicates that authorization has been confirmed. In some embodiments, 2 the authorization specification is provided as part of a first transaction recorded in a distributed ledger, the signatures are provided as part of a second transaction to consume an output of the first transaction, and the second transaction is not valid unless the authorization has been confirmed. In some embodiments, the authority weights of at least two authorities are different. In some embodiments, the authorization specification includes a threshold weight and an authority weight for a parent authority. The method further generates a children sum of authority weights of child authorities whose signatures have been verified. When the children sum of the authority weights satisfies the threshold weight of the parent authority, the generating of the sum of the authority weights of the verified signatures factors in the authority weight of the parent authority rather than the authority weights of the child authorities. In some embodiments, a signature of an authority is a hash of a first transaction encrypted using a private key of a private/public key pair of the authority. The first transaction identifies the authorization specification, and the signature verification information for the authority is the public key of the private/public key pair of the authority. In some embodiments, the signature verification information for an authority is a public key of a private/public key pair of the authority. In some embodiments, the authorization specification includes, for each authority, an indication of an authorization technique for that authority.

In some embodiments, a computer-readable storage medium storing an authorization specification is provided. The authorization specification includes a root node with a threshold weight and child nodes of non-leaf nodes. Each child node has an authority weight. When a child node is a leaf node, the authorization specification includes signature verification information of an authority. When a child node is a non-leaf node, the authorization specification includes a threshold weight. In some embodiments, the authorization specification is stored as a part of a transaction in a distributed ledger. In some embodiments, the signature verification information for an authority is a public key of a private/public key pair of the authority. In some embodiments, each non-leaf node includes at least two child nodes. In some embodiments, at least two sibling nodes have different authority weights. In some embodiments, the authority weight of a sibling node satisfies the threshold weight of its parent node and a sum of the authority weights of the other sibling nodes satisfies the threshold weight of their parent node.

In some embodiments, a computer system is provided for confirming an authorization based on multiple signatures, the computer system comprises one or more computer-readable storage mediums and one or more processors for executing the computer-executable instructions stored in the one or more computer-readable storage mediums. The computer-readable storage mediums store an authorization specification represented as a tree. The tree has a root node with a threshold weight and child nodes of non-leaf nodes. Each child node has an authority weight. When a child node is a leaf node, the authorization specification includes signature verification information of an authority. When a child node is a non-leaf node, the authorization specification includes a threshold weight. The computer-readable storage mediums store signatures of at least some of the authorities. The computer-readable storage mediums further store computer-executable instructions. The computer-executable instructions, for signatures of an authorities, verify the signature using the signature verification information of the authority. For each set of sibling nodes, the computer-executable instructions sum the authority weights of zero or more sibling nodes that are leaf nodes and have verified signatures of their authorities and sum the authority weights of zero or more non-leaf nodes whose threshold weight is satisfied by the authority weights of their child node and when the sum of the authority weights satisfies the threshold weight of the parent node of the sibling nodes, indicate that the threshold weight of the parent node is satisfied. The computer-executable instructions, when the threshold weight of the root node is indicated as being satisfied, indicate that the authorization has been confirmed. In some embodiments, the computer-executable instructions further record a first transaction with the authorization specification in a distributed ledger, extract the signatures from a second transaction to consume an output of the first transaction, and record the second transaction in the distributed ledger when the authorization has been confirmed. In some embodiments, the distributed ledger is a blockchain. In some embodiments, the first transaction includes a script with an instruction for confirming authorization based on multiple signatures. In some embodiments, the authority weights of at least two sibling nodes are different. In some embodiments, a signature of an authority is a hash of a first transaction encrypted by using a private key of a private/public key pair of the authority, the first transaction identifies the authorization specification, and the signature verification information for an authority is the public key of the private/public key pair of the authority. In some embodiments, the signature verification information for an authority is a public key of a private/public key pair of the authority.

In some embodiments, a method performed by a computing system for confirming an authorization is provided. The method determines whether authority weights associated with authorities who provided their authorizations satisfy a threshold weight. At least two of the authorities are associated with different authority weights. Upon determining that the authority weights satisfy the threshold weight, the method indicates that the authorization has been confirmed. In some embodiments, the authorization is for consuming an output of a transaction recorded in a distributed ledger. In some embodiments, the output specifies an amount of a cryptocurrency. In some embodiments, the threshold weight and the authority weights are specified in an authorization specification. In some embodiments, the authorization of an authority is a signature of the authority with a private key of a private/public key pair of the authority over information relating to a matter being authorized. In some embodiments, the information relating to the matter being authorized is a hash derived from the matter being authorized.

In some embodiments, a method performed by a computing system for confirming an authorization is provide. The method accesses a Boolean expression of an authorization specification based on authorities. The Boolean expression does not represent a threshold number of authorizations out of equal authorizations. The method accesses an indication of verified authorizations of the authorities. For each authority whose authorization is verified, the method sets its value to true. For each authority whose authorization is not verified, the method sets setting its value to false. The method evaluates the Boolean expression based on the setting. The method indicates that the authorization is confirmed when the Boolean expression evaluates to true.

In some embodiments, a computing system for confirming an authorization for an authority is provided. The method determines whether authority weights associated with authorizations of the authority satisfy a threshold weight. At least two of the authorizations are associated with different authority weights. The method, upon determining that the authority weights satisfy the threshold weight, indicates that the authorization has been confirmed. In some embodiments, the authorizations are based on different private/public key pair algorithms. In some embodiments, the authorizations are based on different techniques for providing authorizations. In some embodiments, a technique is based on a security token. In some embodiments, a technique is based on a private/public key pair.

In some embodiments, a method performed by a computing system for confirming an authorization based on multiple signatures is provided. The method accesses an authorization specification that specifies signature verification that specifies a first signature based on a first signature algorithm and a second signature based on a second signature algorithm. The method verifies a first signature using the first signature algorithm. The method verifies a second signature using the second signature algorithm. The method indicates that authorization has been confirmed based on the verifications. In some embodiments, the first signature algorithm is based on a classical algorithm and the second signature algorithm is based on a post-quantum algorithm. In some embodiments, authorization is confirmed when both the first signature and the second signature are verified.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, various types of authorization techniques may be used, such as RSA-2048, RSA-4096, and so on. The authorization verification information may be augmented to specify the type of authorization technique so that the WMA system selects the appropriate technique when verifying an authorization. Accordingly, the invention is not limited except as by the appended claims.

I claim:

1. One or more computing systems for confirming an authorization of a transaction to consume an output of a prior transaction comprising an authorization specification of the prior transaction stored in a distributed ledger, wherein the authorization specification comprises a tree structure comprising a root node and a plurality of child nodes of the root node of the authorization specification, wherein each of the plurality of child nodes is either a leaf node or a non-leaf node, wherein the root node of the authorization specification comprises a threshold weight, each leaf node comprises an authority weight and a public key, wherein each non-leaf node has at least one descendant child leaf node, the one or more computing systems comprising:

one or more processors;
one or more memories;
a check authorization component;
a receive consume multi-signature transaction component configured to:
 receive the transaction, wherein the transaction comprises signatures;
 extract one or more signatures from the received transaction;
 extract the authorization specification from the prior transaction;
 store the extracted authorization specification in the one or more memories; and
 invoke the check authorization component for the root node of the authorization specification, wherein the invoking of the check authorization component further comprises passing an indication of the root node of the authorization specification to the check authorization component;
wherein the check authorization component is configured to:
 initialize a first total weight variable for the root node of the authorization specification;
 select a first leaf node that is a child node of the root node of the authorization;
 perform a verification check on a signature of the first leaf node based on the extracted signatures;
 in response to determining that the signature of the first leaf node has been verified,
  increment the first total weight variable for the root node of the authorization specification by an authority weight of the first leaf node;
 select a non-leaf node that is a child node of the root node of the authorization specification;
 initialize a second total weight variable for the non-leaf node;
 select a second leaf node that is a child node of the non-leaf node;
 perform a verification check on a signature of the second leaf node based on the extracted signatures;
 in response to determining that authorization was passed for the second leaf node,
  increment the second total weight variable for the non-leaf node by an authority weight of the second leaf node;
 determine whether the incremented second total weight variable for the non-leaf node exceeds a threshold weight of the non-leaf node; and
 in response to determining that the incremented second total weight variable for the non-leaf node exceeds the threshold weight of the non-leaf node, increment the first total weight variable for the root node of the authorization specification by an authority weight of the non-leaf node;

determine whether the incremented first total weight variable for the root node of the authorization specification is greater than or equal to a to the threshold weight of the root node of the authorization specification; and in response to determining that the incremented first total weight variable for the root node of the authorization specification is greater than or equal to the threshold weight of the root node of the authorization specification, send, to the receive consume multi-signature transaction component, an indication that the authorization of the transaction has been confirmed; and wherein the receive consume multi-signature transaction component is further configured to:

receive, from the check authorization component, the indication that the authorization of the transaction has been confirmed; and record the transaction on the distributed ledger in response to receiving the indication that the authorization of the transaction has been confirmed.

2. The one or more computing systems of claim 1, further comprising:

a component configured to record the prior transaction with the authorization specification in the distributed ledger.

3. The one or more computing systems of claim 2, wherein the distributed ledger is a blockchain.

4. The one or more computing systems of claim 2, wherein the prior transaction includes a script with an instruction for confirming authorization based on multiple signatures, wherein the script includes instructions for summing authority weights associated with the multiple signatures and wherein the instruction for confirming authorization based on the multiple signatures includes comparing the summed authority weights associated with the multiple signatures to at least one threshold weight.

5. The one or more computing systems of claim 2, wherein authority weights of at least two sibling nodes of the authorization specification are different.

6. The one or more computing systems of claim 2, wherein at least one of the extracted signatures is a hash of the prior transaction encrypted with a private key of a private/public key pair.

7. The one or more computing systems of claim 1, wherein the distributed ledger is a blockchain.

8. The one or more computing systems of claim 1, wherein at least two nodes of the authorization specification have different authority weights.

9. The one or more computing systems comprising of claim 1, further comprising a check constraints component.

10. A method, performed by one or more computing systems comprising one or more processors and one or more memories, wherein the one or more memories store a receive consume multi-signature transaction component and a check authorization component, for confirming an authorization of a transaction to consume an output of a prior transaction comprising an authorization specification of the prior transaction stored in a distributed ledger, wherein the authorization specification comprises a tree structure comprising a root node and a plurality of child nodes of the root node of the authorization specification, wherein each of the plurality of child nodes is either a leaf node or a non-leaf node, wherein the root node of the authorization specification comprises a threshold weight, each leaf node comprises an authority weight and a public key, wherein each non-leaf node has at least one descendant child leaf node, the method comprising:

receiving, by the receive consume multi-signature transaction component, the transaction, wherein the transaction comprises signatures;

extracting, by the receive consume multi-signature transaction component, one or more signatures from the received transaction;

extracting, by the receive consume multi-signature transaction component, the authorization specification from the prior transaction;

storing, by the receive consume multi-signature transaction component, the extracted authorization specification in the one or more memories;

invoking, by the receive consume multi-signature transaction component, the check authorization component for the root node of the authorization specification, wherein the invoking of the check authorization component further comprises passing an indication of the root node of the authorization specification to the check authorization component;

initializing, by the check authorization component, a first total weight variable for the root node of the authorization specification;

selecting, by the check authorization component, a first leaf node that is a child node of the root node of the authorization specification;

performing, by the check authorization component, a verification check on a signature of the first leaf node based on the extracted signatures;

in response to determining that the signature of the first leaf node has been verified, incrementing, by the check authorization component, the first total weight variable for the root node of the authorization specification by an authority weight of the first leaf node;

selecting, by the check authorization component, a non-leaf node that is a child node of the root node of the authorization specification;

initializing, by the check authorization component, a second total weight variable for the non-leaf node;

selecting, by the check authorization component, a second leaf node that is a child node of the non-leaf node;

performing, by the check authorization component, a verification check on a signature of the second leaf node based on the extracted signatures;

in response to determining that authorization was passed for the second leaf node, incrementing, by the check authorization component, the second total weight variable for the non-leaf node by an authority weight of the second leaf node;

determining, by the check authorization component, whether the incremented second total weight variable for the non-leaf node exceeds a threshold weight of the non-leaf node; and in response to determining that the incremented second total weight variable for the non-leaf node exceeds the threshold weight of the non-leaf node, incrementing, by the check authorization component, the first total weight variable for the root node of the authorization specification by an authority weight of the non-leaf node;

determining, by the check authorization component, whether the incremented first total weight variable for the root node of the authorization specification is greater than or equal to the threshold weight of the root node of the authorization specification;

in response to determining that the incremented first total weight variable for the root node of the authorization specification is greater than or equal to the threshold weight of the root node of the authorization specification, sending, by the check authorization component, to the receive consume multi-signature transaction component, an indication that the authorization of the transaction has been confirmed;

receiving, by the receive consume multi-signature transaction component, from the check authorization component, the indication that the authorization of the transaction has been confirmed; and recording, by the receive consume multi-signature transaction component, the transaction on the distributed ledger in response to receiving the indication that the authorization of the transaction has been confirmed.

11. The method of claim 10, further comprising:
recording, by the receive consume multi-signature transaction component, the prior transaction in the distributed ledger.

12. The method of claim 10, wherein the distributed ledger is a blockchain.

13. The method of claim 10, wherein the prior transaction includes a script with an instruction for confirming authorization based on multiple signatures, wherein the script includes instructions for summing authority weights associated with the multiple signatures and wherein the instruction for confirming authorization based on the multiple signatures includes comparing the summed authority weights associated with the multiple signatures to a threshold weight.

14. The method of claim 10, wherein at least one of the extracted signatures is a hash of the prior transaction encrypted with a private key of a private/public key pair.

15. The method of claim 10, wherein authority weights of at least two sibling nodes of the authorization specification are different.

16. The method of claim 10, wherein a first signature of the a first authority is generated using a first private key generated using a first algorithm and wherein a second signature of the first authority is generated using a second private key generated using a second algorithm, wherein in the first algorithm is different from the second algorithm.

17. The method of claim 10, wherein the prior transaction is associated with accessing a safety deposit box or entering a secure location.

18. The method of claim 10, wherein the prior transaction is associated with leaving a country.

19. The method of claim 10, wherein the prior transaction is associated with selling or purchasing personal or real property.

20. The method of claim 10, wherein the one or more memories further store a check constraints component.

21. The method of claim 20, further comprising:
checking, by the check constraints component, whether each non-leaf node of the authorization specification has more than one child node; and in response to determining that a first non-leaf node has only one first child node,
replacing, by the check constraints component, the first non-leaf node with the first child node.

22. The method of claim 20, further comprising:
checking, by the check constraints component, whether there are no duplicate public keys in the authorization specification; and checking, by the check constraints component, whether a sum of all possible combinations of authority weights of child nodes of a first parent node is not greater than a maximum integer value to prevent an overflow when checking authorizations.

* * * * *

UNITED STATES PATENT AND TRADEMARK OFFICE
CERTIFICATE OF CORRECTION

| | |
|---|---|
| PATENT NO. | : 11,263,605 B2 |
| APPLICATION NO. | : 15/933283 |
| DATED | : March 1, 2022 |
| INVENTOR(S) | : Konstantinos Chalkias |

It is certified that error appears in the above-identified patent and that said Letters Patent is hereby corrected as shown below:

On the Title Page

On the page 2, in Column 1, item (56) under "Other Publications", Line 22, delete "pratical" and insert -- practical --.

On the page 2, in Column 2, item (56) under "Other Publications", Line 5, delete "15," and insert -- 16, --.

On the page 2, in Column 2, item (56) under "Other Publications", Line 25, delete "M10.l/_" and insert -- M10.1/_ --.

In the Specification

In Column 7, Line 19, delete "Adelman" and insert -- Adleman --.

In Column 7, Lines 31-32, delete "an the" and insert -- an --.

In Column 7, Line 55, delete "ECSA" and insert -- ECDSA --.

In the Claims

In Column 17, Line 53, in Claim 9, after "systems" delete "comprising".

In Column 20, Line 5, in Claim 16, delete "the a" and insert -- a --.

Signed and Sealed this
Eleventh Day of October, 2022

*Katherine Kelly Vidal*
Katherine Kelly Vidal
*Director of the United States Patent and Trademark Office*